United States Patent
Mullaney et al.

[11] Patent Number: 5,882,241
[45] Date of Patent: Mar. 16, 1999

[54] TOY VEHICLE WITH MOVABLE FRONT END

[76] Inventors: Sean T. Mullaney, 548 Terrace Ave., Cincinnati, Ohio 45220; Michael G. Hoeting, 3578 Drakewood Ave., Cincinnati, Ohio 45209; Jonathan A. Jaffe, 7 Lexton Run, Voorhees, N.J. 08043; Vladamir Leonov, 208 E. Village La., Chadds Ford, Pa. 19317; Shohei Suto, No. 23-17, Higashi-yotsugi 1-chome, Katsushika-ku, Tokyo, Japan

[21] Appl. No.: 788,877

[22] Filed: Jan. 22, 1997

[51] Int. Cl.$^6$ .......................... A63H 17/36; A63H 17/385
[52] U.S. Cl. .......................... 446/462; 446/454; 446/466; 446/469
[58] Field of Search .......................... 446/460, 462, 446/465, 456, 468, 446, 437, 466, 469

[56] References Cited

U.S. PATENT DOCUMENTS

| | | | |
|---|---|---|---|
| 1,581,688 | 4/1926 | Pehrson | 105/4.1 |
| 1,948,744 | 7/1934 | Curtiss | 180/12 |
| 2,026,181 | 12/1935 | Kennedy | 446/444 |
| 2,209,457 | 7/1940 | Hare | 180/56 |
| 2,216,497 | 8/1940 | McHenry | 46/213 |
| 2,398,541 | 4/1946 | Leach | 180/209 |
| 2,836,254 | 5/1958 | Boehner | 180/56 |
| 3,619,940 | 11/1971 | Good et al. | 446/469 |
| 4,055,021 | 10/1977 | Okamoto | 463/63 |
| 4,163,341 | 8/1979 | Jones et al. | 46/262 |
| 4,187,637 | 2/1980 | Nielsen | 446/444 |

(List continued on next page.)

FOREIGN PATENT DOCUMENTS

| | | |
|---|---|---|
| 0 694 323 A1 | 1/1996 | European Pat. Off. . |
| 879 071 | 4/1953 | Germany . |
| 3240712 | 5/1984 | Germany . |
| 472946 | 10/1937 | United Kingdom . |
| 967429 | 8/1964 | United Kingdom . |
| 1 278 082 | 6/1972 | United Kingdom . |
| 2 087 739 A | 6/1982 | United Kingdom . |
| 2 130 904 A | 6/1984 | United Kingdom . |
| 2 139 104 A | 11/1984 | United Kingdom . |
| 2 215 626 A | 9/1989 | United Kingdom . |
| 2 227 679 A | 8/1990 | United Kingdom . |

OTHER PUBLICATIONS

Magazine article entitled "Mattel's Wild Race To Market", Business Week, Feb. 21, 1994, pp. 62 and 63.

Primary Examiner—Robert A. Hafer
Assistant Examiner—Michael Priddy
Attorney, Agent, or Firm—Panitch Schwarze Jacobs & Nadel, P.C.

[57] ABSTRACT

A radio controlled toy vehicle has a central chassis, a front end mounting a pair of front wheels which is rotatably coupled to the front of the chassis and a rear end mounting a pair of rear wheels. An electric motor is provided in the chassis to selectively rotate the front end with the front wheels about a generally longitudinal axis through a partial rotation for steering or through as many complete rotations as desired for stunts. In one embodiment, the front end includes a yoke pivotally supporting a pivot body mounting the front wheels. The rear end contains a propulsion drive coupled to the rear wheels and is pivotally coupled with the chassis so that both rear wheels remain grounded as the chassis pivots in reaction to rotation of the front end for steering. In another embodiment, a stop is provided to limit the rotation of the front end. The stop releasably engages a collar around a shaft rotating the front end and is disengaged by providing more torque to the shaft. A remote hand control unit includes manual actuators and switches to generate signals for left steer, right steer, left continuous rotation and right continuous rotation of the front end as well as forward and reverse propulsion.

16 Claims, 6 Drawing Sheets

U.S. PATENT DOCUMENTS

| | | | |
|---|---|---|---|
| 4,254,577 | 3/1981 | Cheng | 446/444 |
| 4,327,519 | 5/1982 | Cooper et al. | 446/444 |
| 4,382,599 | 5/1983 | Tilbor | 463/59 |
| 4,385,466 | 5/1983 | ReVelle | 446/267 |
| 4,415,157 | 11/1983 | Lahr | 104/304 |
| 4,457,101 | 7/1984 | Matsushiro | 446/456 |
| 4,463,520 | 8/1984 | Crosman | 446/443 |
| 4,522,607 | 6/1985 | Kilroy et al. | 446/447 |
| 4,568,306 | 2/1986 | Martin | 446/437 |
| 4,596,534 | 6/1986 | Ishimoto | 446/466 |
| 4,655,724 | 4/1987 | Law | 446/443 |
| 4,691,798 | 9/1987 | Engelbach | 180/209 |
| 4,822,316 | 4/1989 | Shaffer et al. | 446/466 |
| 4,846,758 | 7/1989 | Chou | 446/437 |
| 4,892,502 | 1/1990 | Hesse | 446/454 |
| 4,902,271 | 2/1990 | Yoneda | 446/440 |
| 5,019,009 | 5/1991 | Chao-Chin et al. | 446/437 |
| 5,100,368 | 3/1992 | Chien | 475/149 |
| 5,240,451 | 8/1993 | Clark, Jr. | 446/465 |
| 5,259,808 | 11/1993 | Garr | 446/437 |
| 5,273,480 | 12/1993 | Suto | 446/456 |
| 5,312,288 | 5/1994 | Williams | 446/468 |
| 5,334,077 | 8/1994 | Bailey | 446/446 |
| 5,449,311 | 9/1995 | Williams | 446/468 |
| 5,709,583 | 1/1998 | Suto et al. | 446/460 |

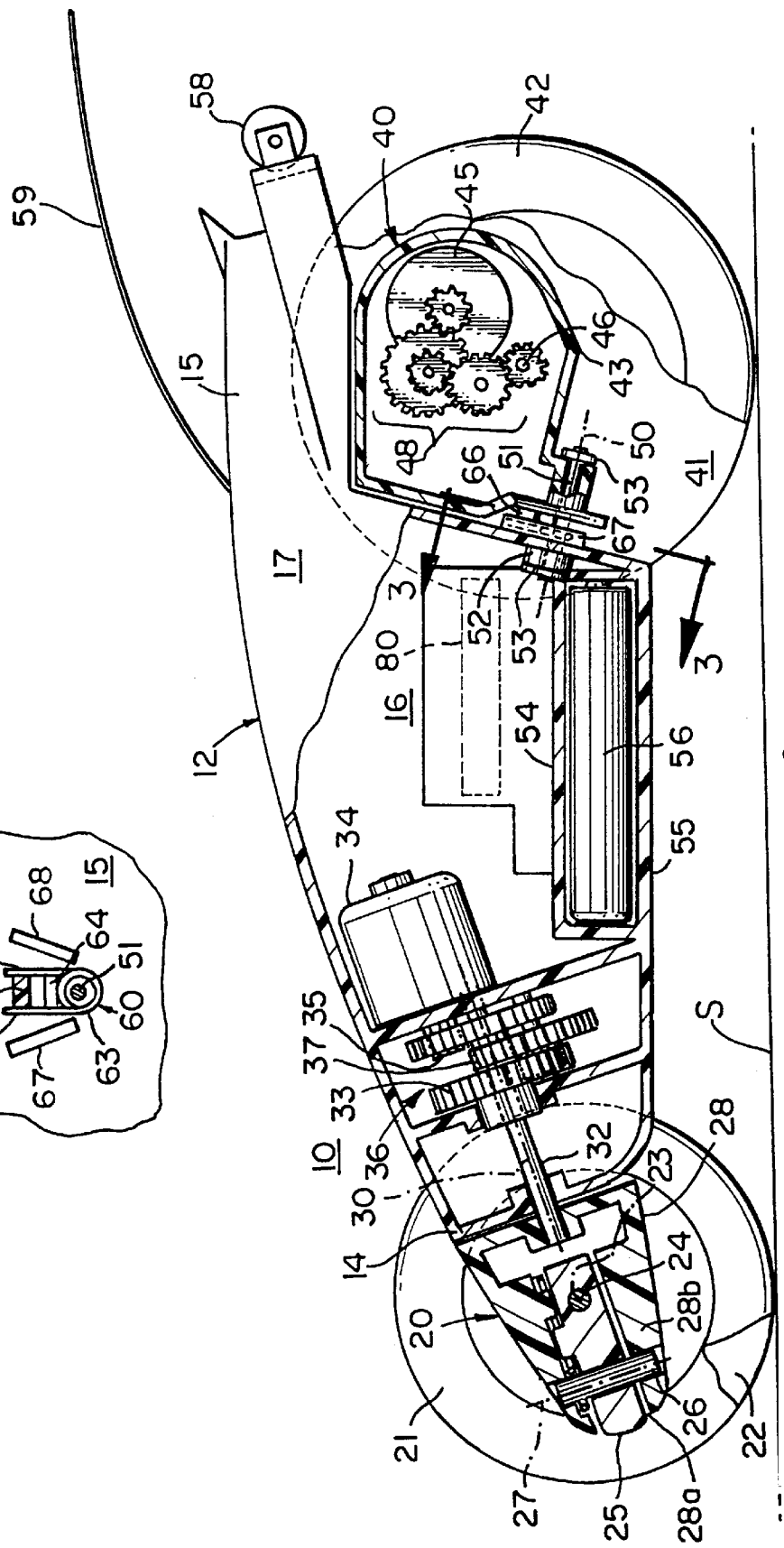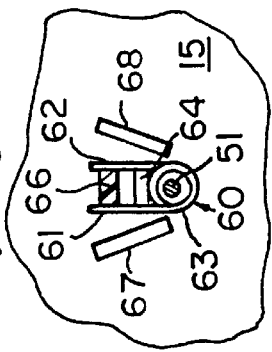

TOY VEHICLE WITH MOVABLE FRONT END

BACKGROUND OF THE INVENTION

The present invention relates to toy vehicles and, in particular, to powered, propelled toy vehicles having unusual transformation and action capabilities.

Toy vehicles are well known. Remotely controlled and radio-controlled toy vehicles, in particular, have come to constitute a significant specialty toy market. Manufacturers constantly seek new ways and features to add innovative action to such toys to make such vehicles more versatile, more entertaining or both.

U.S. Pat. No. 5,259,808 discloses a four-wheeled, flip-over toy vehicle. One end of a front axle of the vehicle mounts the two front wheels and is pivotally coupled with the remainder of the vehicle. The front axle is latched into a normal operating position parallel to the back axle so that all four wheels define a common support plane. A mechanism permits the latch to automatically release after predetermined movement of the vehicle. A spring is provided between the front end and the remainder of the vehicle to pivot the remainder of the vehicle away from the front axle when the latch is released, thereby causing the vehicle to flip over.

Each of U.S. Pat. Nos. 2,398,541, 4,691,798 and 5,019,009 discloses a vehicle or toy vehicle provided with one or more auxiliary, ground contacting wheels, which are mounted to rotate on axes extending generally perpendicularly to the longitudinal axis of the vehicle and to pivot about a pivot axis running generally parallel to the longitudinal axis of the vehicle. As was the case with the toy vehicle of U.S. Pat. No. 5,259,808, the axles and auxiliary wheels of these vehicles are permitted to pivot only through a limited arc which is a fraction of a full circle.

SUMMARY OF THE INVENTION

In one aspect, the invention is a toy vehicle comprising: a chassis having a front, a rear and opposing lateral sides, the opposing lateral sides also being part of opposing lateral sides of the vehicle; at least one rear wheel coupled with the chassis and located on the vehicle so as to at least partially support the rear of the chassis; a propulsion prime mover drivingly coupled with the at least one rear wheel; a front end pivotally coupled with the chassis so as to rotate completely around a front axis extending at least generally longitudinally with respect to the chassis and the vehicle; a pair of front wheels mounted on opposing lateral sides of the front end so as to rotate freely around a front wheel axis extending transversely through the front end; and a steering prime mover mounted on one of the chassis and the front end and drivingly coupled with a remaining one of the chassis and the front end so as to rotate the front end at least partially around the longitudinal axis.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, which are diagrammatic:

FIG. 1 is a partially phantom, partially broken away schematic side elevation view of a first embodiment toy vehicle of the present invention;

FIG. 3 is a local, cross sectional elevation view taken along the lines of 3—3 in FIG. 1;

DETAILED DESCRIPTION OF THE INVENTION

Figure 2:
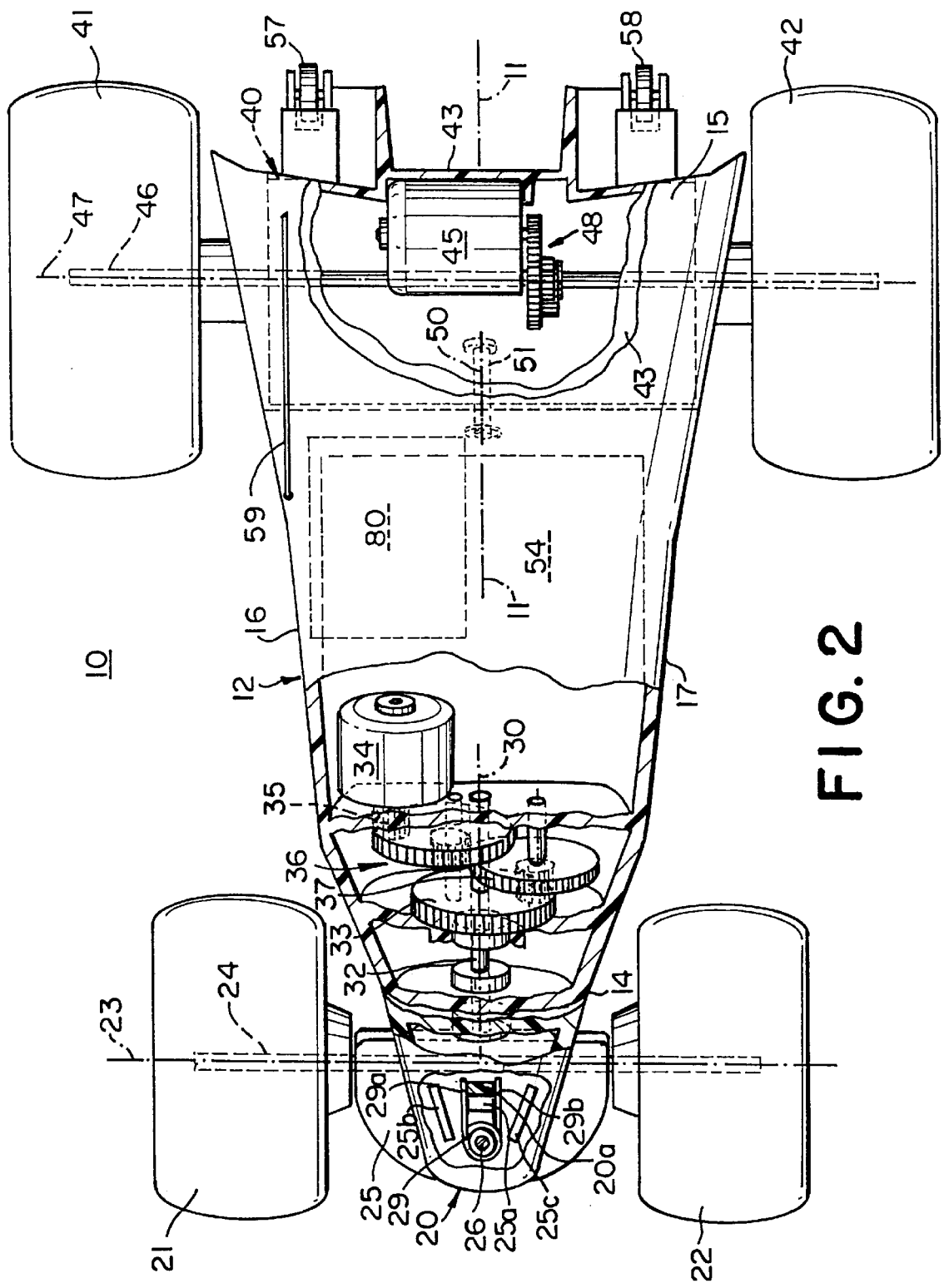
FIG. 2 is a partially phantom, partially broken away, schematic top view of the vehicle of FIG. 1.

Certain terminology is used in the following description for convenience only and is not limiting. The words "right," "left," "lower" and "upper" designate directions in the drawings to which reference is made. Words "inwardly" and "outwardly" refer to directions towards and away from, respectively, the geometric center of the toy vehicle and designated parts thereof. The terminology includes the words above specifically mentioned, derivatives of those words and words of similar meaning.

In the drawings, like numerals are used to indicate like elements throughout. There is shown in the various FIGS. 1–7, a first embodiment toy vehicle 10 of the present invention or its components. Referring to FIGS. 1, 2 or both, the toy vehicle 10 has a central longitudinal plane 11 and includes a chassis indicated generally at 12 having a front 14, a rear 15 and, in FIG. 2, opposing lateral sides 16 and 17, which are also parts of opposing lateral sides of the vehicle 10. Vehicle 10 further includes a separate front end indicated generally at 20 and a separate rear end indicated generally at 40. As used herein, chassis refers to a load-bearing structure centered between and coupled with the front and rear ends. The chassis 12 may be integrally formed with an outer skin or body in monologue construction or may be formed separate from and support a non-load bearing outer skin or body.

The front end 20 preferably includes a pair of front wheels 21 and 22, which are mounted on opposing lateral sides of the front end 20 so as to support the front 14 of the chassis 12 and be located on opposing lateral sides 16 and 17 of the vehicle 10, contacting the ground, at least when in a neutral steering position shown in FIGS. 1 and 2 supported on a horizontal surface S (FIG. 1). The pair of front wheels 21, 22 are preferably mounted so as to rotate freely around a front wheel axis 23, which is preferably the central axis of a front axle 24. Axis 23 and axle 24 extend transversely through a preferably conical body 28 of front end 20 and are horizontal when the front wheels 21, 22 are both being supported in a neutral steering position (i.e., parallel to the central plane 11) on a horizontal surface S.

In the toy vehicle 10, axle 24 is extended through a pivot body 25 transversely to a front caster axis 27, which is the central axis of a front caster axle 26. Pivot body 25 is received in a central opening 28a of a yoke 28b provided on a front end of body 28 and is pivotally supported on axle 26 so as to pivot within the surrounding yoke 28b around axis 27 over a predetermined angular range preferably of about±20° or less. Caster axle 26 and its central axis 27 lie in the central plane 11, are oriented generally perpendicular to front wheel axle 24 and its central axis 23 and are more generally vertical than horizontal, at least in the neutral steering position of the front wheels depicted in FIGS. 1 and 2, with axle 24 and axis 23 perpendicular to a central longitudinal plane 11. The front wheels 21, 22 are thus mounted on the pivot body 25 so as to pivot with the pivot body 25 on the yoke 28b and effectively caster on the front end 20.

As is best seen in FIG. 2, a biasing member and centering means in the form of a coil torsion spring 29 is provided on shaft 26 between the upper side of pivot body 25 and the lower facing inner side of yoke 28b. Tangs 28a and 29b extend in parallel from opposite sides of an intermediate coil portion 29c of the spring 29. A first centering boss 20a extends downward from the upper inner surface of yoke 28b facing pivot body 25 and between tangs 29a, 29b. A second centering boss 25a extends upwardly from the pivot body 25 between the tang ends 29a, 29b. The bosses 20a and 25a are longitudinally aligned with each other and shaft 26 in vehicle 10 when the front wheel axis 23 and axle 24 are perpendicular to the central longitudinal plane 11 of the vehicle 10 in the neutral steer position of the vehicle. As the pivot body 25 tends to rotate about axis 26 and axle 27, the centering bosses 20a and 25a separate. Tangs 29a, 29b span opposite sides of each of the bosses 20a, 25a and thereby simultaneously engage the pivot block 25 and front end body 28 such that rotation of the pivot body 25 around axle 26 is increasingly resisted. Additional bosses 25b and 25c can be provided projecting upwardly on either side of boss 25a to limit the maximum rotation of the pivot body 25 in the yoke 28b.

The rear end 40 includes at least one and preferably a pair of ground contacting rear wheels 41, 42, which are coupled through the rear end 40 with the chassis 12 so as to each at least partially support the rear 15 of the chassis 12 on support surface S and be located on opposing lateral sides 16 and 17 of the vehicle 10. The rear end 40 preferably includes a housing 43 containing at least one propulsion prime mover 45, which is drivingly coupled with at least one wheel of the pair of rear wheels 41, 42. The propulsion prime mover 45 is preferably a reversible electric motor and may be the only motor provided for vehicle propulsion. The motor 45 is drivingly coupled preferably with both of the rear wheels 41, 42 in a conventional fashion through a reduction gear drive train indicated schematically at 48 within housing 43. Any of a variety of single motor drive arrangements used previously in such toy vehicles may be employed in vehicle 10 including but not limited to that of U.S. Pat. No. 5,273,480 to Suto, which is incorporated by reference herein. Typically, such arrangements include a reduction spur gear train or other reduction transmission, which may drive a solid axle 46 having a central axis 47 and to which both of the rear wheels 41, 42 are fixedly attached. Alternatively, separate collars (not depicted) may be provided on a fixed rear axle or on a pair of stub axles, with the collars being driven by the reduction gearing and fixedly coupled at their extreme outer ends to the wheels 41, 42 to drive the wheels 41, 42 through the collars. While one propulsion motor 45 is required for driving both rear wheels 41, 42, a pair of propulsion motors could be provided. Preferably the pair of motors would be coupled together so as to simultaneously drive the two rear wheels 41, 42. However, less desirably, each of a pair of propulsion motors can be coupled separately with and independently drive a separate one of the rear wheels 41, 42.

According to a basic aspect of the present invention, the front end 20 is pivotally coupled with the chassis 12 so as to rotate at least partially around and, preferably, rotate completely around a front pivot axis 30 extending generally longitudinally with respect to the vehicle 10 and chassis 12 (i.e., having a generally front and rear direction) and lying in the central longitudinal plane 11. Preferably, the rear end of the axis 30 is pitched upward from the front end, for example, at an angle of about 20° from the horizontal, to impart front wheel steering capability to vehicle 10. Front pivot axis 30 is preferably the central axis of a front longitudinal shaft 32 and defines at least part of a pivot between front end 20 and chassis 12. Shaft 32 has a first end preferably fixedly secured with the yoke 28 of the front end 20 for simultaneous rotation of the front end 20 with the shaft 32 and a second end rotatably coupled to the chassis 12.

Preferably, a steering prime mover 34 is supported on the chassis 12 and is operatively, drivingly coupled with the front end 20 through the front longitudinal shaft 32 and a reduction drive coupling, which is indicated generally at 36. Coupling 36 is operatively located between the steering prime mover 34 and the front longitudinal shaft 32. Preferably the prime mover 34 is another reversible electric motor and the reduction drive coupling 36 is a reduction spur gear transmission located between the prime mover/motor 34 and the front longitudinal shaft 32. A drive member, for example, a pinion 35 mounted on the drive shaft of the steering prime mover/motor 34 may be drivenly coupled with a driven member, for example, a final gear 33 of coupling 36, which is fixedly mounted to the front longitudinal shaft 32, to rotate the front shaft 32 and the front end 20 through as many intermediate reduction and/or idler gears 37 as desired. The steering prime mover/motor 34 and the reduction drive coupling 36 can rotate the shaft 32 in either rotational direction at least partially around front longitudinal axis 30 for steering and, preferably, without rotational limitation so that the front end 20 can be rotated completely around the front longitudinal axis 30 as many complete revolutions in either rotational direction as desired for stunts as long as the steering prime mover/motor 34 is appropriately powered and activated.

According to a second important aspect of the invention, the rear end 40 is also pivotally coupled with the chassis 12 so as to pivot about a rear pivot axis which in this embodiment is a second longitudinal axis 50 extending generally front and rear with respect to the vehicle 10 and chassis 12 in the central longitudinal plane 11. The second longitudinal axis 50 will also be referred to as the rear pivot axis of 50 of the vehicle 10 and is further preferably defined by a second longitudinal shaft 51, which will also be referred to herein as the rear longitudinal shaft or rear pivot shaft 51. Shaft 51 may be horizontal (not shown) or may be pitched, for example upward back to front at about a 15° to 20° angle from the horizontal, as shown in FIG. 1, to impart rear wheel steering capability to vehicle 10. One of the rear end 40 and chassis 12 can be fixedly coupled with the rear longitudinal shaft 51 while the other is pivotally coupled with the shaft 51 or both the rear end 40 and chassis 12 can be pivotally coupled to the shaft 51. One possible arrangement is shown diagrammatically in FIG. 1. A split saddle 52 may be provided within the chassis 12 at the rear 15 and one end of the shaft 51 rotatably secured in the saddle 52 by lock collar(s) 53. The remaining rear end of the shaft 51 can be passed entirely through a lowermost portion of the rear end 40 and rotatably secured thereto also by lock collar(s) 53 as depicted or secured within the rear end 40. One or more of the lock collars might be replaced by disrupted surfaces on the shaft 51 interfering with part of the chassis 12 or rear end 40 or by a stop surface or a thrust bearing (none depicted).

Preferably, the pivotal movement of the rear end 40 with respect to the chassis 12 is limited and the chassis 12 and rear end 40 are spring biased with respect to one another so as to center the chassis 12 perpendicularly upright with respect to the transverse rear axis 47 through the center of the rear wheels 41, 42. As shown in FIG. 3, a bias member and centering means in the form of a coil torsion spring 60 is mounted on the rear longitudinal shaft 51. Tangs 61, 62 extend from either lateral side of a coil 63 of the spring 60 on shaft 51. A first centering boss 64 projects rearwardly from the rear of the chassis 12 between the tangs 61, 62 while a second centering boss 66 projects forwardly from the rear end 40 between the tangs 61, 62. The bosses 64, 66 are vertically aligned with each other and the shaft 51 when the chassis 12 is angularly centered in a neutral position on the rear end 40. The tangs 61, 62 span opposite sides of each of the bosses 64, 66 to simultaneously engage the rear end 40 and chassis 12 such that rotational movement separating the first and second centering bosses 64, 66, spreads the tangs 61 and 62. This spread is resisted by the coil 63 of the spring 60 which thus biases the chassis 12 to an annularly neutral (i.e., upright) position with respect to the rear end 40. Additional bosses 67 and 68 can be provided projecting rearwardly from the lower side of the rear 15 of the chassis 12, on either side of the boss 64, at points where the additional bosses 67 and 68 may be contacted by the centering boss 66 on the rear end 40, to limit the rotational movement of the rear end 40 with respect to the chassis 12 (and vice versa).

Still referring to FIGS. 1 and 2, chassis 12 is also preferably provided with a recess into its bottom side forming a battery compartment 54 receiving a preferably rechargeable, battery power supply 56. A hinged door 55 can be mounted to the chassis 12, and releasably latched in a conventional manner to close the battery compartment 54. Alternatively, the door 55 can be omitted and a rigid battery pack latched into the chassis like a removable body panel. At least one and preferably a pair of auxiliary wheels 57 and 58 are mounted on the chassis 12 so as to project rearwardly from the upper rear 15 of the chassis 12 in a position to come into contact with the surface S supporting the vehicle 10 should the vehicle 10 perform a front wheel rise or "wheelie" stunt maneuver. The auxiliary wheels 57, 58 are extended rearward sufficiently to support the vehicle 10 in a raised position and prevent the vehicle 10 from pivoting entirely over onto its top side.

The vehicle 10 is remotely controlled and, preferably, radio controlled. An antenna 59 is preferably mounted to the chassis 12 and electrically coupled with circuitry 80 within the chassis 12 in a conventional fashion. The battery power supply 56 is also electrically coupled with the circuitry 80 and preferably through the circuitry 80 with each of the prime mover/motors 34 and 45.

Figure 4:
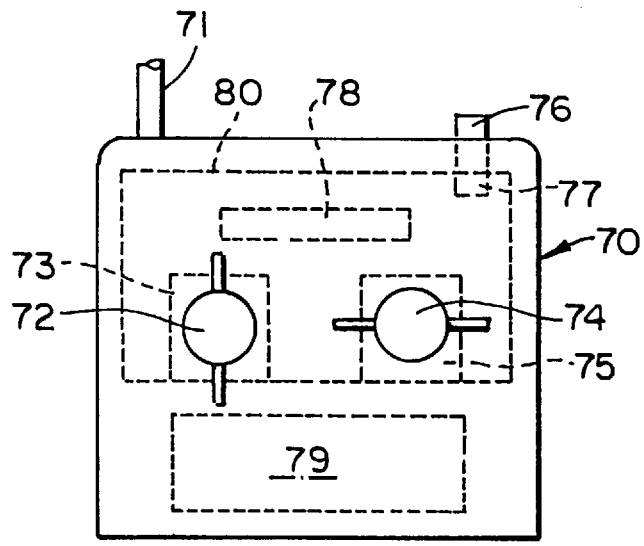
FIG. 4 is a partially phantomed, schematic front elevation of a hand control unit to use with the vehicle of FIGS. 1–3.

FIG. 4 depicts one possible hand control unit 70 to remotely control the vehicle 10. The unit 70 includes an external antenna 71, and manual actuator means in the form of a first toggle lever 72, a second toggle lever 74 and a depressible button 76. Toggle levers 72 and 74 are coupled with three-position switches 73 and 75, respectively, while button 76 is coupled with momentary contact switch 77. Switches 73, 75 and 77 are indicated in phantom and are coupled in circuit with a programmed microprocessor 78 and a battery power supply 79, both also indicated in phantom. Microprocessor 78 responds to activation of switches 73, 75 and 77 from movements of the levers 72, 74 and button 76 to generate and transmit an encoded radio signal through antenna 71 to the vehicle 10. As depicted, first toggle lever 72 and switch 73 control forward and reverse movement of vehicle 10. Second toggle lever 74 and switch 75 control left and right steering. Lever 74 and switch 75 can also cause the front end 20 to rotate continuously for one or more revolutions if the vehicle's weight is not being supported by the front end 20, for example, when vehicle 10 is performing a "wheelie" maneuver. Depressible button 76 and switch 77 in combination with second toggle lever 74 and switch 75 control continuous rotation of the front end 20 of the vehicle 10 about the front longitudinal axis 30 in opposing directions when one or both front wheels 21, 22 are bearing weight of the vehicle 10 on a support surface S. That is, vehicle 10 responds to simultaneous depression of button 76 and movement of lever 74 to continuously rotate the front end 20 on shaft 32.

This is one of several different possible variations in which propulsion, steering and continuous rotation of the front end 20 of vehicle 10 might be controlled. Instead of a three position switch 75, second toggle lever 74 might be coupled with a five-position switch (not depicted) in which the central position of lever 74 is a neutral (no steer) position, extreme left and right positions of the lever 74 are continuous rotations (e.g., counter-clockwise and clockwise), respectively, about front longitudinal axis 30 and shaft 32, and intermediate positions of the lever 74 between the central and extreme end positions are left steer and right steer positions. The operator can be assisted in distinguishing between the steering positions and the rotation positions of such a toggle lever in various ways. A step may be provided in the toggle lever path to require the toggle lever to be moved in a transverse jog along an otherwise straight path of movement between each steering position and the adjoining rotating position of the lever. Alternatively, detent springs may be positioned within the unit 70 to resist movement of the toggle lever 74 beyond the intermediate left and right steering positions. The operator will sense and know that the spring resistance or a greater spring resistance will have to be overcome in order to move the lever 74 to an extreme right or left position in order to cause full power to be applied to the front end 20.

The microprocessor 78 and associated circuitry of the hand control unit 70 are suggestedly configured to generate bursts of information in the form of signals which are superimposed on a carrier frequency at regular intervals for radio transmission from the unit 70. Each such burst identifies one of at least six possible vehicle states: forward, reverse, left steer, right steer, left continuous rotation, right continuous rotation. A seventh burst can also be provided for bringing the vehicle to a full stop in the neutral steering position. This prevents the vehicle 10 from undesirably responding to faint stray radio signals when it is desired to keep the vehicle still. Other known and conventional radio or other wireless remote control or a hard-wired control may be implemented in the alternative.

Figure 5:
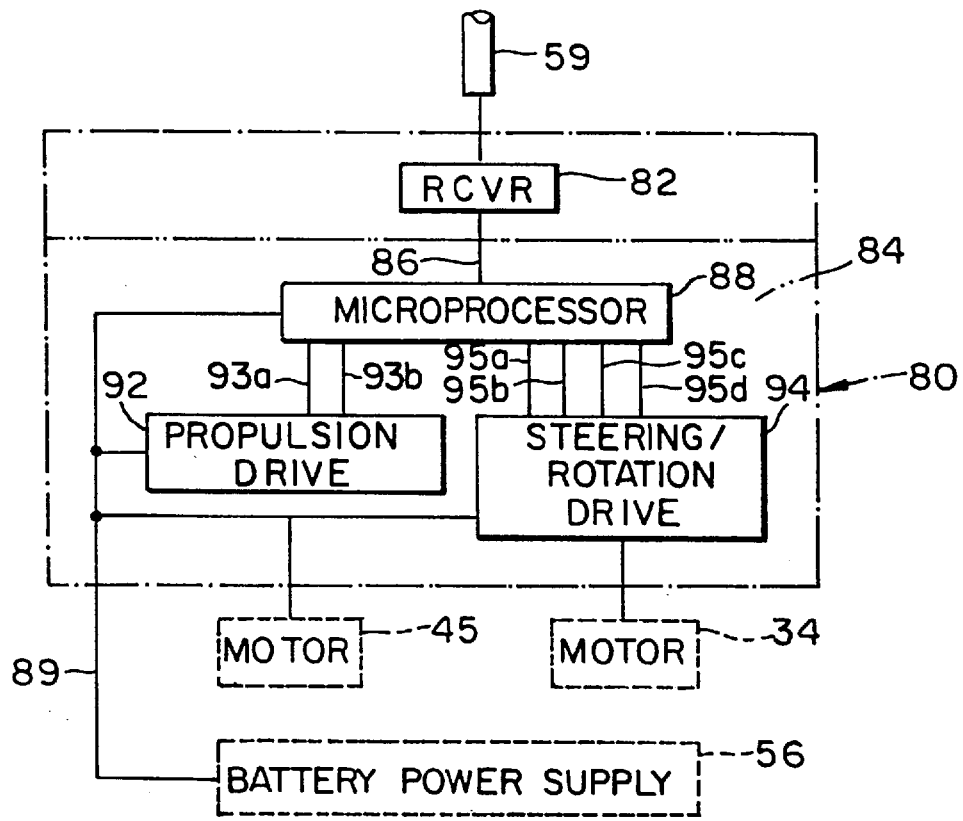
FIG. 5 is a schematic view of the electrical system of the vehicle of FIGS. 1–3.

FIG. 5 depicts schematically, in block diagram form, the circuitry 80 of the vehicle 10. The circuitry 80 has two major sections: a receiver 82 coupled with the vehicle antenna 59 and a controller 84, indicated in phantom, which is coupled by means of a suitable channel 86 with the receiver 82. The controller 84 further includes a pre-programmed microprocessor 88, a propulsion drive 92 and a steering/rotation drive 94. Power supplied to the propulsion and steering motors 45 and 34 is provided through the drives 92, 94, respectively, and is provided to the microprocessor 88 through line 89 from the battery power supply 56 in the vehicle. Two channels 93a, 93b couple the propulsion drive 92 with the processor 88 and control forward and reverse operation of the propulsion prime mover/motor 34. Four channels 95a–95d couple the processor 88 with the steering/rotation drive 94 and provide left steer, left rotate, right steer, right rotate signals, respectively. An alternative set of signals might be left turn, right turn, low power, high power. Steering is suggestedly accomplished by providing a lower voltage, for example by means of a shortened duty cycle of power supplied to the steering prime mover/motor 34 than would be supplied for continuous rotation of the front end 20. The actual voltage required for steering and for continuous rotation when the front end 20 is engaged with the support surface S would depend on the characteristics of a particular toy vehicle 10.

Figure 6:
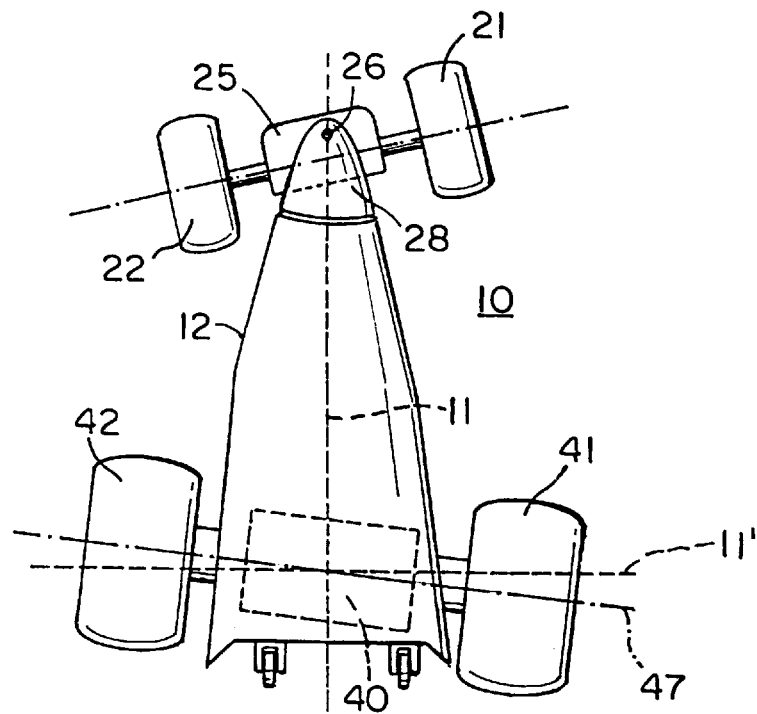
FIG. 6 is a schematic top plan of the vehicle in FIGS. 1–3 with the front end partially rotated for steering.
Figure 7:
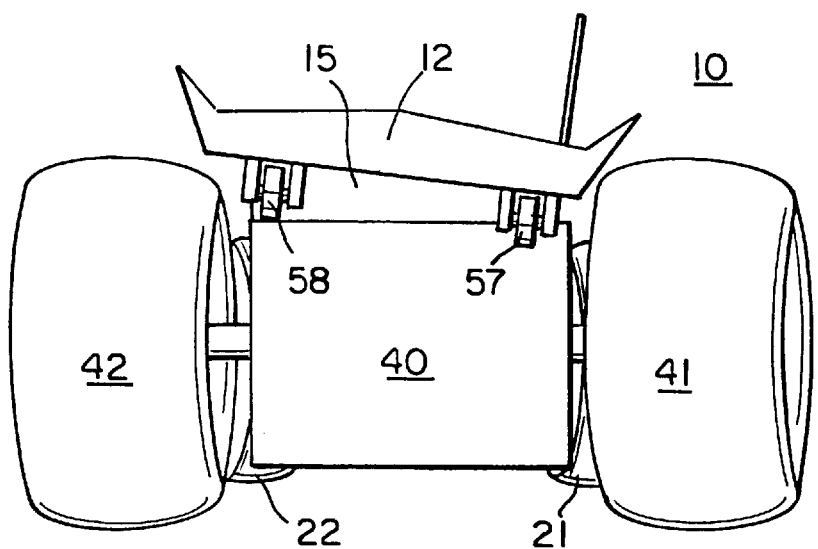
FIG. 7 is a schematic rear end view of the vehicle in the configuration of FIG. 6.

FIGS. 6 and 7 depict the orientation of the front end 20 and front wheels 21, 22 with respect to the chassis 12 and of the rear end 40 with respect to the chassis 12, respectively, in a left turn. Looking from the chassis 12 towards the front end 20, the longitudinal shaft 32 is rotated slightly counterclockwise. About 15° to 20° of rotation from the neutral position is all that is needed for steering the vehicle 10. Without the pivot block 25 and pivot axle 26, the right (passenger) wheel 21 would normally tend to lift from the surface S supporting the vehicle 10. However, with the pivot block 25 and pivot axle 26, the effect of rotating longitudinal shaft 32 slightly counterclockwise is to cause the right wheel 21, which is the outside wheel of the turn, to pivot or caster forward around the pivot axle 26. This forces the left wheel 22, which is the inner wheel of the turn, backward around axle 26 towards the chassis 12. At the same time, the chassis 12 is supporting the steering prime mover/motor 34 and rotates in reaction in an opposite direction (clockwise looking forward through the vehicle 10). This reaction rotates the top of the chassis 12 to the right, out and away from the center of the turn, while rotating the bottom of the chassis 12 and the battery power supply 56 to the left, inward towards the center of the turn, thereby reducing the moment of inertia of the vehicle 10 about the center of the turn and effectively improving the stability of the vehicle 10 through the turn.

Because the chassis 12 is pivotally mounted to the rear end 40, the rear end 40 will not rotate with the chassis 12 but will remain relatively upright on the support surface S with both rear wheels 41, 42, contacting the surface S. However, because rear pivot axis 50 is pitched from the horizontal, rotation of the chassis 12 about that axis causes both the chassis and end of the axis to move laterally and the rear end 40 to respond by rotating slightly in the horizontal plane in a direction opposite the rotation of pivot body 28 about axle 26 to follow the forward end of axis 50, effectively providing four wheel steering to vehicle 10. Thus, the entire rear end 40 including rear wheel rotational axis 47, is canted with respect to axis 11'. Axis 11' is perpendicular to the original longitudinal central plane 11 through the vehicle 10 in the neutral steer position of the vehicle shown in FIGS. 1 and 2. Of course, if the vehicle 10 is made to turn sufficiently sharply with a sufficiently high rate of speed, the chassis 12 can rotate sufficiently for the centering boss 66 on the rear end 40 to contact one of the limiting bosses 67, 68. In such a case, the rear wheel 41, 42 closest to the center of the turn may be lifted slightly or even significantly from the surface S.

If a spin command is given through the hand control unit 70, the front end 20 will rotate completely around front longitudinal shaft 32 for as long as the command continues to be given. If the vehicle 10 is moving forward at a sufficiently fast speed when a spin command is given, the vehicle will tend to flip over onto one of its sides or its back. Spinning the front end 20 after the vehicle 10 is on its side or back will tend to cause the vehicle 10 to right itself. While it is trying to right itself, the vehicle 10 may spin around its rear wheel contacting the surface supporting the vehicle on one of its sides. The vehicle 10 can be made to do a "wheelie" stunt maneuver by driving it in reverse and then quickly reversing direction to move forward. While the front end 20 is elevated, it can be rotated in either direction using only steering commands to give the front end 20 the appearance of a propeller on an airplane. The two auxiliary wheels 57 and 58 in the upper rear of the vehicle 10 tend to keep the vehicle 10 from flipping backward over onto its back when performing a wheelie stunt. Also, if the vehicle 10 is commanded to spin its front end 20 while the vehicle is at rest, the front wheel will "walk" around roughly the center of the rear wheels of the vehicle 10 causing the vehicle 10 to effectively turn or spin relatively slowly in place around a vertical axis centered between its rear wheels.

If desired, the upper side of the chassis 12 can be provided with a wing or other raised structure, preferably along the central longitudinal plane 11 which defines a peak, preferably over or at least near the rear wheels, to tend to cause the vehicle to roll over onto one of its sides should it flip upside down. It is then possible to right the vehicle from almost any position on which it is lying on its side by spinning the front end.

While spur gear sets are suggested for both the steering reduction drive 3G and the rear propulsion drive 48, other arrangements can be provided. For example, any suitable alternative arrangements of gears or other reduction drive including but not limited to planetary arrangements and worm gears or non-gear drives might be provided depending upon the nature of the prime mover 34 and/or 45 selected and the desired capability and speed of the vehicle 10. For example, where only steering capability is required or desired, a rotary action solenoid or other limited rotation prime mover may be coupled directly between the front end 20 and the chassis 12.

While the rear end 40 is shown to be pivotally movably supported from the chassis 12, the rear end including the rear transverse axis 47 on which the rear wheels 41, 42 rotate can be fixed with respect to the chassis 12.

While the steering prime mover/motor 34 is disclosed as being mounted in the chassis 12 and as rotating the front end 20 by rotating front longitudinal shaft 32, the prime mover could be located in the front end and rotate the front end of the shaft. Furthermore, instead of driving the shaft 32 which pivotally connects the front end 20 and chassis 12, both the chassis and front end can be rotatable with respect to the shaft 32 or another pivot arrangement might be substituted between the front end and chassis 12 to provide a pivotal coupling between the two. The steering prime mover need only be mounted on one of the chassis and front end and drivingly coupled with the remaining one of the chassis and front end for front wheel steering.

The pivot block 25 and yoke 28 effectively provide a castor type mounting of the front wheels 21, 22 with the remainder of the front end 20. Other castor type mountings not employing a yoke but effectively providing the same movement might be substituted. Also, other non-castor type mountings can be used. For example, the transverse axis 23 about which the front wheels 21, 22 rotate can be fixed on the front end. In such a design, greater rotation of the front end, e.g., about 30° to about 45°, may be necessary or desired for a turn radius equivalent to that achieved by only a 20° rotation of the castered front wheels.

Figure 8:
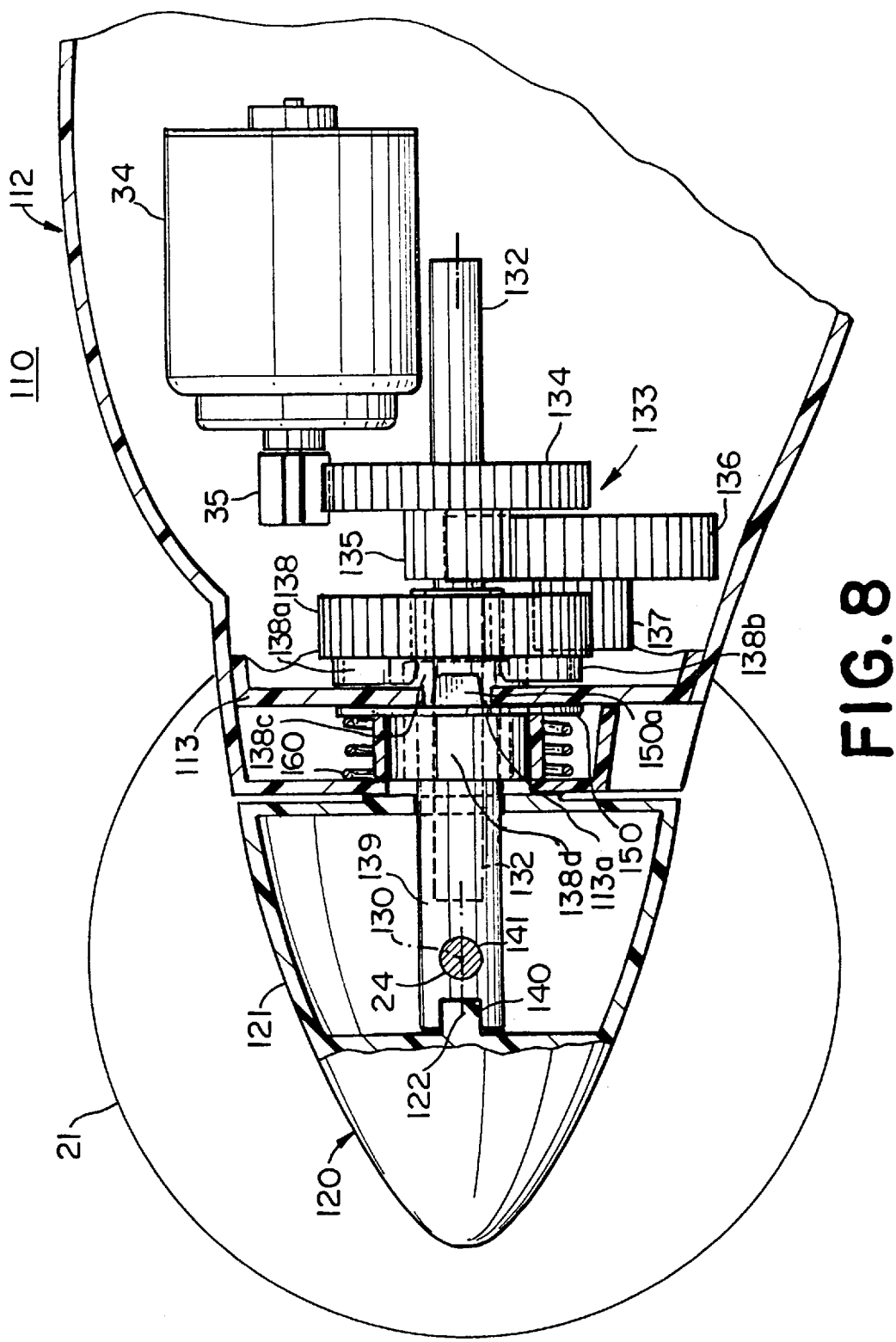
FIG. 8 is a partially broken away side elevation of a second embodiment toy vehicle of the present invention incorporating a detent mechanism.
Figure 10:
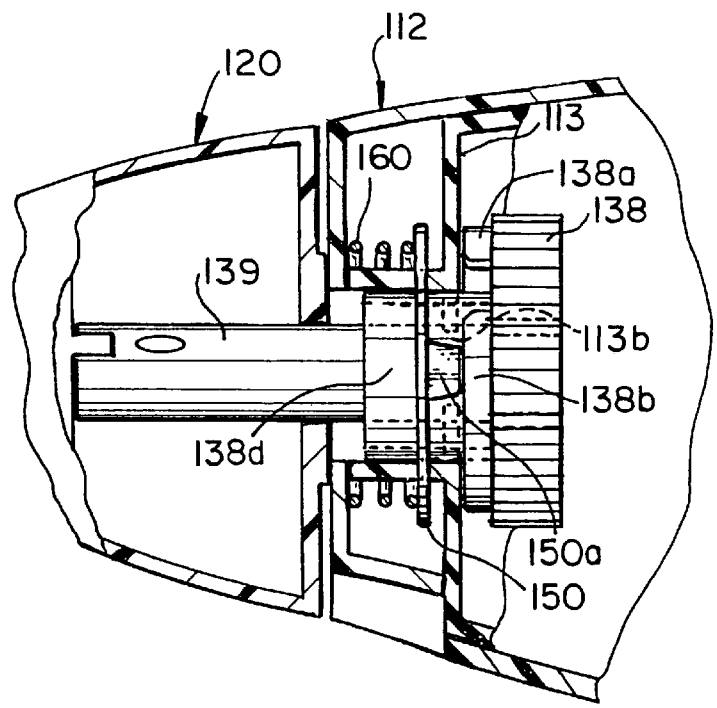
FIG. 10 is a partially broken side elevation detail of the detent mechanism.
Figure 9:
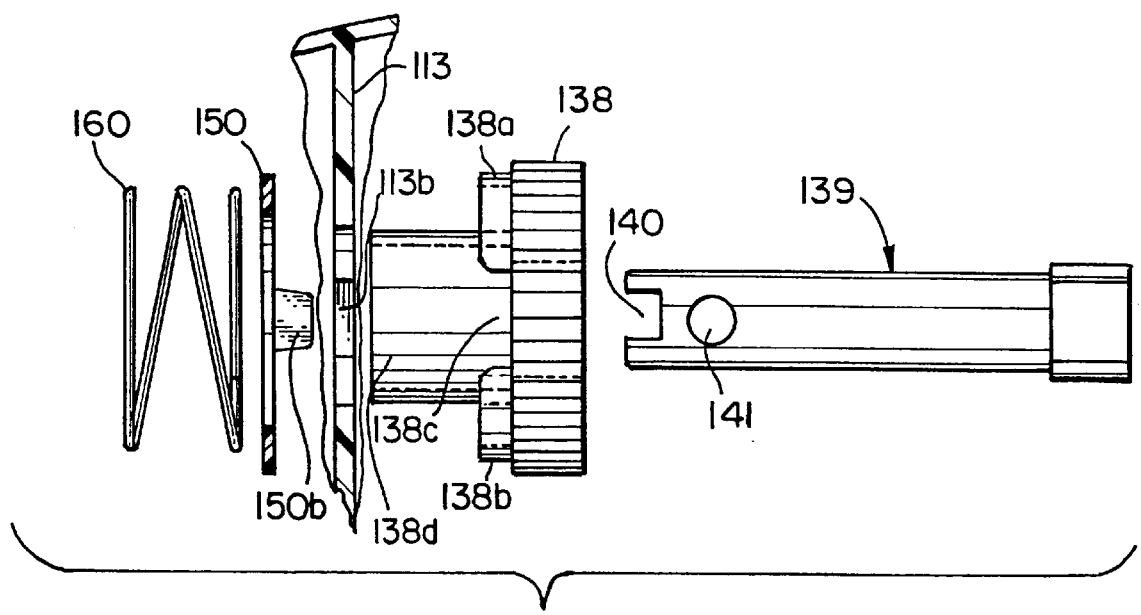
FIG. 9 is a partially broken and exploded side elevation of the components of a detent mechanism.

FIGS. 8–10 show in varying views, a second embodiment coupling between the chassis 112 and front end 120 of another toy vehicle 110. Again, front end 120 is pivotally coupled with the chassis 112 so as to completely rotate around an axis 130 extending generally longitudinally with respect to the vehicle 110 and chassis 112 and lying in the central longitudinal plane of the vehicle 110, which is parallel to the plane of each of the figures. A reversible electric motor/steering prime mover 34 is again supported on the chassis by suitable means, preferably by being incorporated into a second housing, which is omitted from the figures for clarity but which may be attached by suitable means such as screws, to the chassis 112. Motor/prime mover 34 rotates front end 120 preferably through a reduction transmission indicated generally at 133. More specifically, pinion 35 on a drive shaft of motor/prime mover 34 drives a first reduction gear 134, which rotates a second pinion 135 coupled with the gear 134. Pinion 135 rotates a second reduction gear 136 supporting a third pinion 137. Pinion 137 rotates a third reduction gear 138. In this embodiment, gears 134, 135 and 138 freely rotate upon a pin 132, which is provided for support and positioning of the gears. Gear 138 receives and drives a keyed shaft 139, which extends from the chassis 112 into the front end 120. Driven shaft 139 further includes a transverse bore 141 receiving the front wheel axle 24, locking the end of shaft 139 in and fixingly coupling it with the front end 120. However, the axle 24 can be fixedly coupled with the front end body and the end of driven shaft 139 fixedly secured with the front end by other means such as a pin, rivet or screw extended transversely through the front end body and bore 141.

A yoke 140 is provided at the forward end of the driven shaft 139 and mates with an internal transverse rib 122 formed in the body 121 of the front end 120. Pin 132 may be metal and extend substantially along the center of shaft 139 which may be plastic to provide strength and to center the shaft.

Vehicle 110 incorporates an improvement to more predictably control the partial rotation of the front end 120 about the central axis 130 of pin 132 and driven shaft 139. A stop member is preferably releasably engaged with the driven shaft 139. More specifically, reduction gear 138 includes a pair of mirror-image, raised cam surfaces defined by axially extending, mirror-image, arcuate flanges 138a, 138b. Adjoining ends of the flanges 138a, 138b are separated by a pair of diametrically opposed recesses or gaps, one of which is indicated at 138c in each of the three FIGS. 8–10. A rotationally stationary detent ring 150 is provided opposing the gear 138 and separated from the gear 138 by an intervening wall 113. Wall 113 may be an internal wall of the body surrounding or defining the chassis 112 or, as shown, part of a separate housing receiving the reduction transmission 133. Detent ring 150 includes a pair of diametrically opposing stops in the form of cam members, one of which is indicated at 150a in each of FIGS. 8 and 10. The other is indicated at 150b in FIG. 9 where ring 150 has been bisected. Cam members 150a and 150b extend through slots 113a and 113b, respectively, in wall 113. Slot 113a is shown in FIG. 8 where wall 113 has been sectioned at that slot. Slot 113b is shown in FIGS. 9 and 10 where wall 113 is sectioned through a larger opening which receives a tubular sleeve 138d. Sleeve 138d is greater in diameter than shaft 139 yet smaller in diameter that the effective diameters of flanges 138a and 138b. Sleeve 138d provides a pivot bearing surface.

In the neutral position of the front end 120 with the front axle 124 parallel to horizontal and perpendicular to the plane of FIG. 8, the stop/cam member 150a is received in recess 138c as shown in FIG. 8. The remaining stop/cam member is received in the remaining recess (neither depicted) on the other side of gear 138. The recess 138c has a circumferential dimension sufficiently greater than the circumferential dimension of stop/cam member 150a to allow the desired amount of rotational movement of the front end 120 around the chassis 112 with the stop/cam member 150a positioned within recess 138c and thereby engaged, at least indirectly, with shaft 139. Detent ring 150 is biased toward gear 138 by suitable means such as a coil spring 160. Detent ring 150 is held in a stationary position by a close circumferential fit between stop/cam member 150a and the sides of an opening through wall 113 through which stop/cam member 150a extends. In all other respects, toy vehicle 110 is the same as toy vehicle 10 of FIGS. 1–3, 6 and 7.

In operation, when a partial turn/steering command is received by the vehicle 110 supported on its front and rear wheels, only sufficient power is provided to the motor 34 to cause the gear 138 to rotate in either a clockwise or counter-clockwise direction until one of the lateral edges of stop/cam member 150a engages one of the lateral edges of flange 138a or 138b. The extent of the maximum rotation of the front end 120 about longitudinal axis 130 for steering is therefore sharply and predictably controlled. When a spin command is received by the vehicle 110, sufficient additional power is provided to the motor 34 to generate sufficient torque for the flange(s) 138a, 138b of gear 138 to cam member 150a out of the recess 138c, overcoming the resistive force of spring 160, thereby permitting the gear 138 and shaft 139 to continuously rotate and the front end 120 to continuously spin on front pivot axis 130. At each half rotation, stop/cam member 150a re-enters recess 138c or its diametrically opposed opposite and is immediately cammed out of that recess by the continued operation of the motor 34 and rotation of the gear 138.

Alternatively, a stop can be extended from one of the chassis and the front end into engagement with an appropriately positioned recess in the other one of the front end and the chassis. Also, although camming releasable detents have been described, a flexing stop or other detent member might be used.

While four-wheel steering has been described particularly with respect to vehicle 10, it will be appreciated that vehicle 10 or any other vehicle can be provided with only two-wheel steering simply by orienting the longitudinally extending pivot axis 30 or 50 of the nonsteering pair of front or rear wheels, respectively, horizontal. It will further be appreciated that in such arrangement, steering may be accomplished by pivoting the chassis portion of the vehicle with respect to the front or rear end connected to the chassis by the horizontal, longitudinal pivot axis and allowing the remaining end and wheel(s) of the vehicle to caster in response to the rotation of the chassis and end of the pitched longitudinal pivot shaft. Thus, for example, vehicle 10 of FIGS. 1 and 2 can be provided alternatively with only front wheel steering by making rear pivot shaft 51 horizontal. Steering prime mover 34 may be coupled to such a horizontal rear shaft 51 to cause the chassis portion of the vehicle to be rotated around that horizontal rear shaft, thereby indirectly turning the front pair of wheels in reaction to movement of the chassis. Similarly, the front pivot shaft and axis 30 may be oriented horizontally while the rear shaft and axis remain pitched to provide only rear steering.

While a four-wheeled vehicle 10 is shown, it will be appreciated that either a single front wheel or single rear wheel could be provided on the vehicle 10, mounted to rotate about a longitudinally extending pivot axis to achieve caster-type steering, if desired, while the other wheel(s) of the vehicle are powered for propulsion purposes. A castered, single wheel might also be powered for propulsion purposes but to do so would be much more complicated than any of the other arrangements disclosed or proposed above. Of course, if desired, more than two wheels can be provided on either the front or rear end of the vehicle.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

It is claimed:

1. A toy vehicle comprising:
    a chassis having a front, a rear and opposing lateral sides, the opposing lateral sides also being part of opposing lateral sides of the vehicle;
    at least one rear wheel coupled with the chassis and located on the vehicle so as to at least partially support the rear of the chassis;
    a propulsion prime mover drivingly coupled with the at least one rear wheel;
    a front end pivotally coupled with the chassis so as to rotate at least partially around a front pivot axis extending at least generally longitudinally with respect to the chassis and the vehicle;
    a pair of front wheels mounted on opposing lateral sides of the front end so as to rotate freely around a front wheel axis extending transversely to the front pivot axis and through the front end; and
    a steering prime mover mounted on one of the chassis and the front end and drivingly coupled with a remaining one of the chassis and the front end so as to rotate the front end at least partially around the front pivot axis.

2. The toy vehicle of claim 1 further comprising:
    a shaft extending generally longitudinally between the front end and the chassis and defining at least part of a pivot between the front end and the chassis;
    a drive member mounted on the steering prime mover; and
    a driven member drivingly coupled with the drive member and fixedly coupled with one of the front end and the chassis.

3. The toy vehicle of claim 2 wherein the drive member is a pinion and wherein the driven member is a driven gear fixedly mounted on the shaft and drivingly coupled with the pinion and wherein the shaft is fixedly secured with the front end for simultaneous rotation of the front end with the shaft.

4. The toy vehicle of claim 1 wherein the front end comprises:
    a front end body including a yoke with central opening; and
    a pivot body received in the central opening and pivotally supported within the yoke; and
    wherein the front wheels are mounted on the pivot body so as to pivot with the pivot body on the yoke.

5. The toy vehicle of claim 4 wherein the pivot body is pivotally coupled with the yoke so as to pivot about a front caster axis extending at least generally vertically with respect to the vehicle and chassis and lying parallel to and within a central longitudinal plane of the chassis when the front wheel axis is perpendicular to the central longitudinal plane.

6. The toy vehicle of claim 4 further comprising a bias member positioned to simultaneously engage the pivot body and the front end body.

7. The toy vehicle of claim 3 further comprising a stop positioned for releasable engagement with the shaft so as to permit limited rotation of the shaft before release.

8. The toy vehicle of claim 7 wherein the stop is a cam member biased into releasable interference engagement with at least one recess in a collar around the shaft.

9. The toy vehicle of claim 1 further comprising a stop positioned for releasable engagement so as to limit rotation of the front end on the chassis about a neutral steering position.

10. The toy vehicle of claim 1 further comprising:
    a rear end including the at least one rear wheel and the propulsion prime mover, the rear end being pivotally coupled with the chassis so as to pivot about a rear pivot axis extending at least generally longitudinally with respect to the chassis and vehicle.

11. The toy vehicle of claim 10 further comprising a bias member positioned to simultaneously engage the rear end and the chassis and to bias the chassis to an angularly neutral position with respect to the rear end.

12. The toy vehicle of claim 10 further comprising at least one auxiliary wheel projecting from the rear of the chassis generally above the at least one rear wheel.

13. A toy vehicle comprising:
    a chassis having a front, a rear and opposing lateral sides, the opposing lateral sides also being on of opposing lateral sides of the vehicle;
    at least one rear wheel coupled with the chassis and located on the vehicle so as to at least partially support the rear of the chassis;
    a front end pivotally coupled with the chassis so as to rotate at least partially around a front pivot axis extending at least generally longitudinally with respect to the chassis and the vehicle;
    a pair of front wheels mounted on opposing lateral sides of the front end so as to rotate freely around a front wheel axis extending transversely to the front pivot axis across the front end; and
    a steering prime mover mounted on one of the chassis and the front end and drivingly coupled with a remaining one of the chassis and the front end so as to rotate the front end at least partially around the front pivot axis.

14. The toy vehicle of claim 13 further comprising:
    a shaft generally longitudinally between the front end and the chassis and defining at least part of a pivot between the front end and the chassis;
    drive member mounted on the steering prime mover; and
    a driven member drivingly coupled with the drive member and fixedly coupled with one of the front end and the chassis.

15. The toy vehicle of claim 14 wherein the drive member is a pinion and wherein the driven member is a gear fixedly mounted on the shaft and drivingly coupled with the pinion and wherein the shaft is fixedly secured with the front end for simultaneous rotation of the front end with the shaft.

16. The toy vehicle of claim 13 further comprising a radio receiver operably coupled with the steering prime mover.

* * * * *